United States Patent [19]

Nagai

[11] Patent Number: 4,887,845

[45] Date of Patent: Dec. 19, 1989

[54] LABEL FOR FOOD-CONTAINING CAN OR THE LIKE

[75] Inventor: Yoshihiro Nagai, Tokyo, Japan

[73] Assignee: Tokyo Nagai Co., Ltd., Tokyo, Japan

[21] Appl. No.: 25,343

[22] Filed: Mar. 13, 1987

[30] Foreign Application Priority Data

| | | | |
|---|---|---|---|
| Apr. 8, 1986 | [JP] | Japan | 61-80665 |
| Dec. 5, 1986 | [JP] | Japan | 61-187595[U] |

[51] Int. Cl.⁴ ........................ B42D 15/00; G09C 3/02; A44C 3/00

[52] U.S. Cl. ........................................ 283/81; 283/77; 40/637

[58] Field of Search ........................ 283/77, 81, 82, 83; 40/2 R

[56] References Cited

U.S. PATENT DOCUMENTS

| | | | |
|---|---|---|---|
| 2,780,015 | 2/1957 | Whitehead | 283/77 |
| 3,204,354 | 8/1965 | Berger | 283/77 |
| 3,457,661 | 7/1969 | Peters | 283/77 |
| 4,086,379 | 4/1978 | Brown | 428/40 |
| 4,125,653 | 11/1978 | Muzik | 428/40 |
| 4,143,183 | 3/1979 | Rupp et al. | 283/81 |
| 4,159,586 | 7/1979 | Blum | 283/81 |
| 4,276,334 | 6/1981 | Sugihara | 283/81 |
| 4,318,554 | 3/1982 | Anderson et al. | 283/77 |
| 4,324,823 | 4/1982 | Ray | 283/81 |
| 4,406,634 | 7/1984 | Hasegawa | 283/81 |
| 4,430,816 | 2/1984 | Sèton et al. | 40/2 R |
| 4,544,184 | 10/1985 | Freund et al. | 283/77 |
| 4,585,254 | 4/1986 | Adams | 283/81 |
| 4,592,976 | 6/1986 | Whitehead | 283/77 |

FOREIGN PATENT DOCUMENTS

| | | |
|---|---|---|
| 19199 | 8/1975 | Australia . |
| 2541804 | 8/1984 | France . |
| 2568708 | 2/1986 | France . |

OTHER PUBLICATIONS

European Search Report.

*Primary Examiner*—Douglas D. Watts
*Assistant Examiner*—Paul M. Heyrana, Sr.
*Attorney, Agent, or Firm*—Fitch, Even, Tabin & Flannery

[57] ABSTRACT

A label includes a label body which is a conventional one that can be mass-produced in advance and a photograph which is bonded to the label body or inserted into a cut portion provided in the label body. At least the obverse surface of the combination of the label body and the photograph is covered with a substantially transparent film.

1 Claim, 2 Drawing Sheets

LABEL FOR FOOD-CONTAINING CAN OR THE LIKE

BACKGROUND OF THE INVENTION

The present invention relates to a label for attachment to the surface of a container such as a food-containing can.

It is general practice to attach a label to the surface of a food-containing can or the like to indicate its name, contents, etc. In general, a large number of labels with the same indication are produced for each kind of commodity by means of printing.

When commodities are made to be used as mementoes or souvenirs for the expression of congratulations or condolences, there may be a need for labels to be provided with a particular inscription suited to the particular purpose in question. However, since labels are generally produced in large quantities by printing as described above, it is difficult in cost terms to produce labels in batches of several or several tens of one sort for each individual customer. In particular, it is not practical to print labels showing an individually selected photograph from the viewpoint of cost.

SUMMARY OF THE INVENTION

In view of the above-described circumstances, it is a primary object of the present invention to provide a label showing a photograph which can be produced at reduced cost even in a relatively small batch.

To this end, the present invention provides a label comprising: a label body which is a conventional one that can be mass-produced in advance; a photograph bonded to the label body or inserted into a cut portion provided in the label body; and a substantially transparent film covering at least the obverse surface of the combined label body and photograph.

The above and other objects, features and advantages of the present invention will become more apparent from the following description of the preferred embodiments thereof taken in conjunction with the accompanying drawings.

DESCRIPTION OF THE PREFERRED EMBODIMENTS

The present invention will be described hereinunder in detail with reference to the accompanying drawings.

Figure 1:
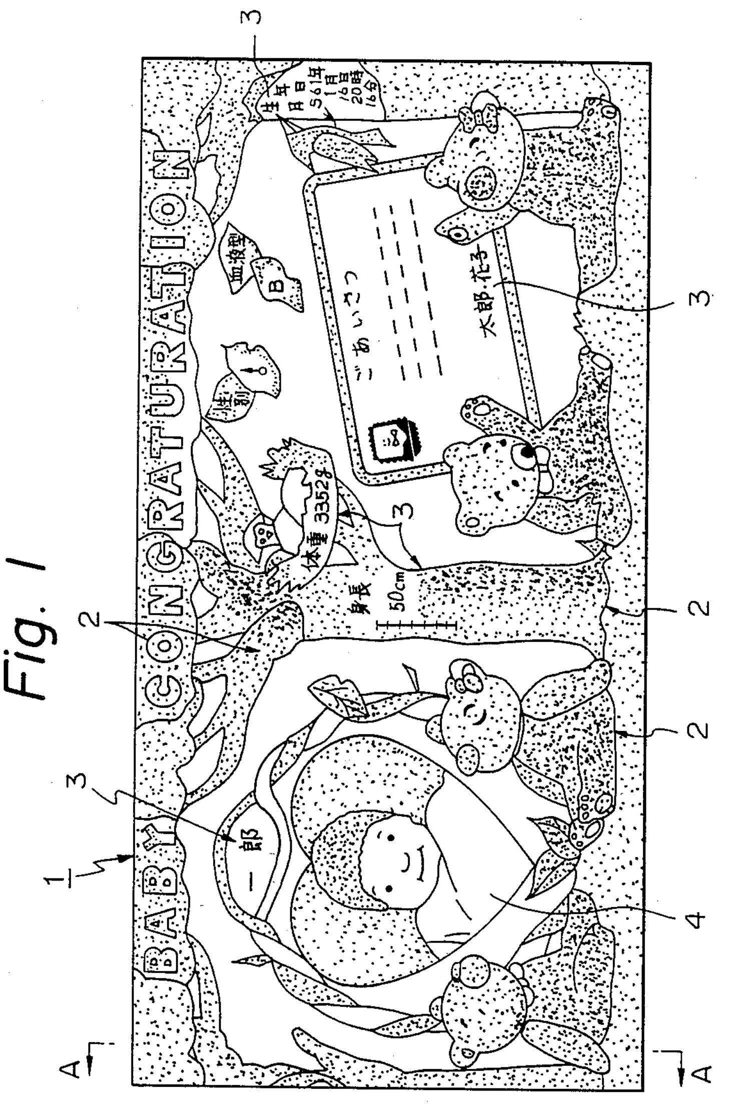
FIG. 1 is a plan view of one embodiment of the label according to the present invention.

Referring first to FIG. 1, which shows a label that may be used for a family celebration of a birth, the reference numeral 1 denotes a label body having a pattern, scene or the like 2 printed in advance. The label body 1 has letters 3 which represent particular information to suit each individual customer's purpose. The letters 3 may be handwritten or otherwise printed. Printing of such letters can be effected at lower cost than the cost of printing the label body 1 including the pattern or the like 2 (in many cases, this would be printed in color), so that printing of the letters 3 in producing a relatively small number of labels will not lead to any sharp increase in the total cost of completed labels.

Figure 2:
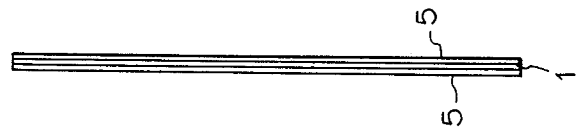
FIG. 2 is a sectional view taken along the line A—A in FIG. 1.

In the embodiment shown in FIG. 1, a photograph 4 which is cut in the shape of a heart is bonded to the label body 1. Both sides of the combined label body 1 and photograph 4 are coated with substantially transparent films 5 of a synthetic resin material which are bonded to the label body. It should be noted that FIG. 2 which is an enlarged sectional view of the label body 1 coated with the films 5 shows the respective thickness of the films 5 and the label body 1 in an exaggerated fashion for the sake of providing a clear illustration. The expression "substantially transparent" means a degree of transparency which enables the indication on the label to be seen satisfactorily. The films 5 are provided for the purpose of protecting the photograph 4 (together with the letters 3 if they need to be protected from the outside air or moisture). It is therefore possible to employ any desired material which is fitting for this purpose. The films 5 may be bonded to the label body 1 using any desired adhesive such as a pressure-sensitive adhesive, a temperature-sensitive adhesive, etc. When the films 5 per se have fusibility, they can be bonded to the label body 1 on heating without using any adhesive. It should be noted that, when both sides of the label body 1 are covered with the films 5 as described above, the films 5 will not necessarily be bonded to the label body 1, and may be utilized in such a manner as to wrap the label body 1 by joining together the upper and lower films 5 along the side edges of the label body 1 by means, for example, of heat sealing. In a case where the films 5 are bonded to the label body 1, only the obverse side of the label body 1, that is, the upper side thereof as viewed in FIG. 1, may be covered with the film 5.

Figure 3:
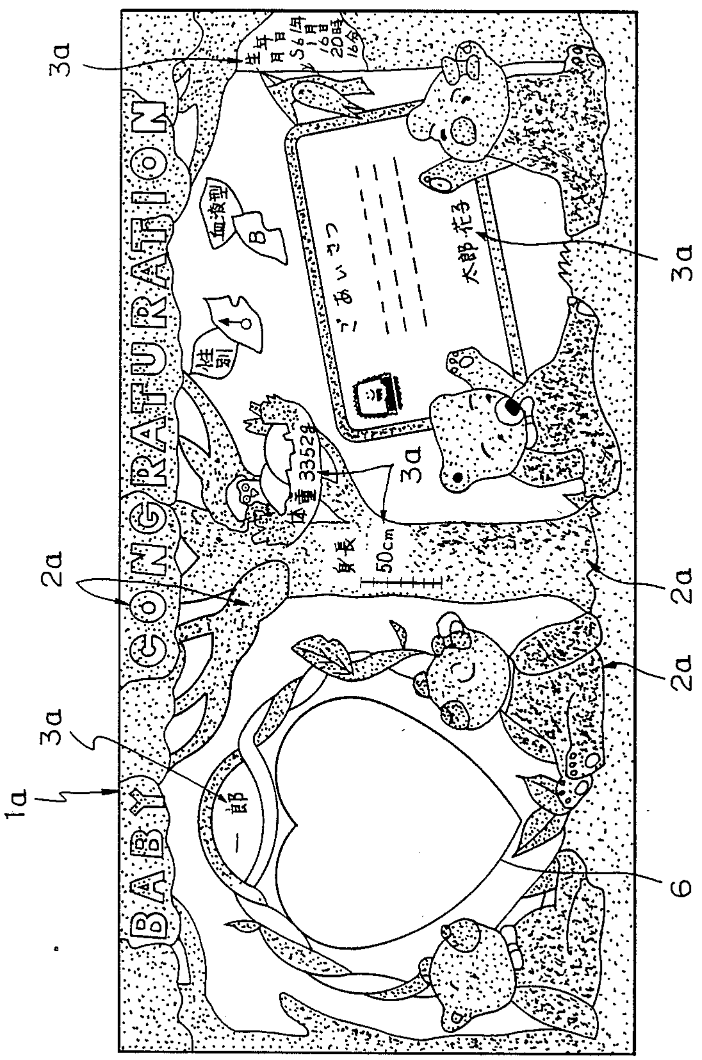
FIG. 3 is a plan view of another embodiment of the label according to the present invention.

FIG. 3 shows another embodiment of the present invention. In this figure, members or portions corresponding to those shown in FIG. 1 are indicated by employing the same reference numerals with the suffix "a" appended thereto, and description thereof is omitted.

In the embodiment shown in FIG. 3, the label body **1*a* has a cut portion 6 for inserting a photograph. A photograph 4 (see FIG. 1) which is cut in the same shape as that of the cut portion 6 is inserted into the latter, and at least the obverse side of the label body 1*a* is coated with a film 5 in the same way as in the case of the embodiment shown in FIG. 1. This coating is preferably effected in such a manner that the film 5 is firmly bonded to the combined label body 1*a* and photograph 4. The form of the cut portion 6 is of course not limited to the illustrated heart-shaped configuration and may be any desired shape. In this case, the photograph employed is naturally cut in the same configuration as that of the cut portion. In the case of the embodiment shown in FIG. 3, in order to retain the inserted photograph 4 in position, the reverse side of the photograph 4 may be fixed to the label body 1*a*** by means of a piece of adhesive tape.

In the embodiment shown in FIG. 3, any difference in level between the surface of the photograph 4 and the label body **1*a*** is very small or zero, so that a label having a smooth surface can be obtained.

The completed label may be used by being attached to the surface of a container such as a food-containing can using an adhesive or double-sided adhesive tape.

As has been described above, according to the present invention, a photograph which a particular customer desires to put on a label is not printed on it but is combined with a label body as a member separate from the latter, and this combination is coated with a substantially transparent film. It is therefore possible to produce original labels at reduced costs even in relatively small batches.

Although the present invention has been described through specific terms, it should be noted here that the described embodiments are not necessarily exclusive and various changes and modifications may be imparted thereto without departing from the scope of the invention which is limited solely by the appended claim.

What is claimed is:

1. The label for attachment to the surface of a container such as a can, comprising:

a label body;

an opening in said label body created by removal from the label body of a cutout portion having a given size and configuration, the opening thereby being defined by the body portion remaining after removal of the cutout portion;

a photograph having substantially the same size and configuration as said opening and being inserted therein; and a substantially transparent coating covering at least the obverse surface of the combination of said label body and said photograph and being firmly bonded thereto, the combination of label body, photograph and coating being capable of conforming to the surface of the container for attachment thereto.

* * * * *

UNITED STATES PATENT AND TRADEMARK OFFICE
CERTIFICATE OF CORRECTION

PATENT NO. : 4,887,845

DATED : December 19, 1989

INVENTOR(S) : Yoshihiro Nagai

It is certified that error appears in the above-identified patent and that said Letters Patent is hereby corrected as shown below:

On the Face of the Patent, column 2, line 2, change "4,406,634" to --4,460,634--.

Column 3, line 13, change "The" to --A--.

Signed and Sealed this

Fifteenth Day of January, 1991

*Attest:*

HARRY F. MANBECK, JR.

*Attesting Officer* *Commissioner of Patents and Trademarks*